United States Patent Office 2,945,892
Patented July 19, 1960

2,945,892
9,10-ENDO-NITROETHYLENE ANTHRACENE

Karl Klager, Monrovia, Calif., assignor to Aerojet-General Corporation, Azusa, Calif., a corporation of Ohio No Drawing. Filed Oct. 19, 1953, Ser. No. 387,022

4 Claims. (Cl. 260—645)

This invention relates to a new composition of matter, 9,10-endo nitroethylene anthracene, having the formula:

This application is a continuation-in-part of my copending application No. 235,569, filed July 6, 1951, now abandoned.

9,10-endo nitroethylene anthracene finds valuable use as an intermediate in the preparation of explosives, rocket fuels and propellant substances. 9,10-endo nitroethylene anthracene is readily converted to substituted derivatives in accordance with the method disclosed in my copending application No. 387,021, filed concurrently with the present application, by reacting 9,10-endo nitroethylene anthracene with compounds such as alkyl halides, halogens, nitrite salts, cyanoalkenes, alkenoic acid esters, etc., to yield anthracene derivatives having the general formula:

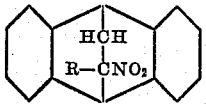

wherein R is alkyl, halogen, ester, nitro, cyanoalkyl, etc.

These 9,10-endo anthracene derivatives may then be pyrolysed in accordance with the method of my copending application No. 387,023, filed concurrently with the present application, to yield the corresponding substituted nitroethylene compounds which may be reacted with compounds having a labile hydrogen atom in the molecule to form polynitro compounds useful as explosives, rocket fuels, and propellant substances. This method is more fully disclosed in my copending application No. 337,211, filed February 16, 1953.

Heretofore whenever attempts have been made to substitute nitroethylene into compounds it has been found that nitroethylene polymerizes so rapidly that polymerization occurs before any substitution can take place, hence it has been virtually impossible to introduce the nitroethylene radical into organic compounds.

I have discovered a new method whereby nitroethylene can be introduced into an organic molecule without undesirable polymerization. The introduction of nitroethylene into an anthracene molecule provides a convenient means for preparing nitroethylene derivatives. Nitroethylene, as an integral portion of the endo anthracene compound readily undergoes substitution reactions and the compounds thus obtained may be easily pyrolysed to liberate the desired substituted nitroethylene compounds.

9,10-endo nitroethylene anthracene is prepared by a Diels-Alder type condensation in accordance with the reaction scheme set forth below:

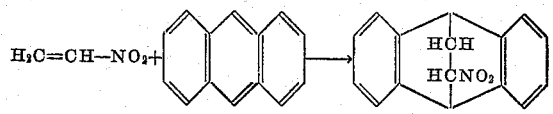

In order to more specifically illustrate the invention, the following example is provided:

EXAMPLE I

*Formation of 9,10-endo nitroethylene anthracene*

One mole of nitroethylene is mixed with one mole of anthracene as shown in Equation 1 in the presence of o-dichlorobenzene. The mixture is heated for 45 minutes at approximately 150° C. The solvent is evaporated and the residue is dissolved in isopropyl ether. After cooling and recrystallization of the product from ethyl alcohol, endo nitroethylene anthracene is obtained. This substance has a melting point between 113–114° C.

The presence of an inert solvent, such as o-dichlorobenzene, is a critical element in the above process; however, any organic solvent may be used providing that it be an inert solvent.

I claim:

1. 9,10-endo-nitroethylene-anthracene having the formula:

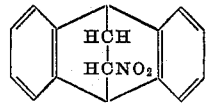

2. The method of preparing 9,10-endo-nitroethylene-anthracene which comprises condensing nitroethylene with anthracene in the presence of an inert organic solvent.

3. The method of claim 2 wherein the inert solvent used is o-dichlorobenzene.

4. The method of preparing 9,10-endo-nitroethylene anthracene which comprises mixing anthracene and nitroethylene in the presence of o-dichlorobenzene; heating the mixture to about 150° C.; evaporating the solvent and recrystallizing the endo-nitroethylene-anthracene.

No references cited.